Oct. 21, 1924.
1,512,162
J. R. DENNIS
METHOD OF FORMING A LACING TIP
Filed March 19, 1923
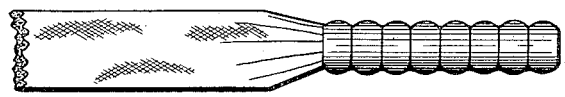
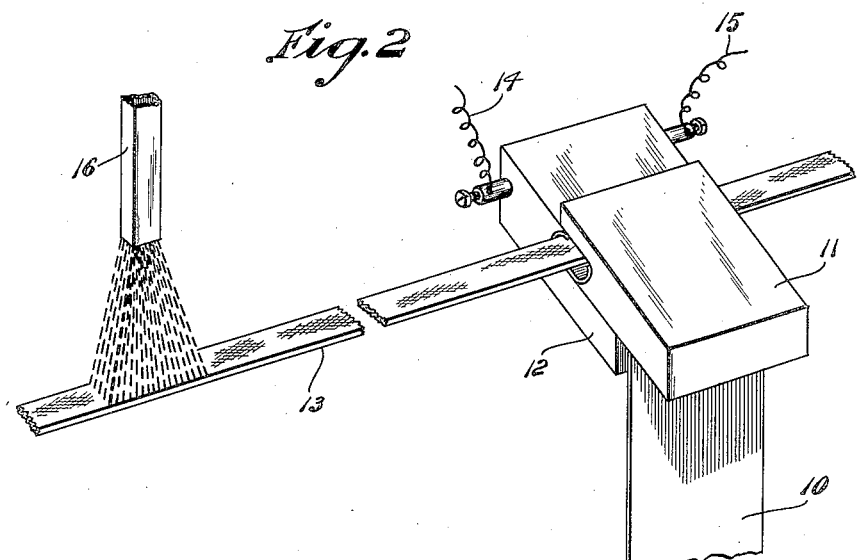
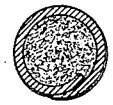
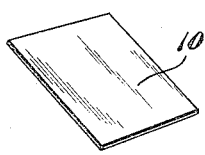
Inventor
John R. Dennis
By Barlow & Barlow
Attorney Patented Oct. 21, 1924.

1,512,162

UNITED STATES PATENT OFFICE.

JOHN R. DENNIS, OF PROVIDENCE, RHODE ISLAND, ASSIGNOR TO INTERNATIONAL BRAID COMPANY, OF PROVIDENCE, RHODE ISLAND, A CORPORATION OF MASSACHUSETTS.

METHOD OF FORMING A LACING TIP.

Application filed March 19, 1923. Serial No. 626,237.

*To all whom it may concern:*

Be it known that I, JOHN R. DENNIS, a citizen of the United States, residing at Providence, in the county of Providence and State of Rhode Island, have invented certain new and useful Improvements in Methods of Forming a Lacing Tip, of which the following is a specification.

This invention relates to an improved method of forming a lacing tip of celluloid, zylonite, bakelite or other similar, moldable material; and the object of this invention is to provide an improved method of applying such a tip to a lacing, which is that of softening the tipping material and compressing it while in a softened state causing portions of the softened material to be compressed into the interstices of the lacing fabric.

A further object of the invention is the applying of a solvent to the covering for softening the same prior to applying pressure to force portion of the softened covering into the interstices of the lacing fabric.

A still further object of the invention is to prepare the dies with a figured lacing-engaging surface and when so prepared to force, imprint or mold the softened tipping surface to conform to the figured surface of the die and simultaneously force the softened portions of the covering into the interstices in the lacing fabric.

With these and other objects in view, the invention consists of certain novel features of construction, as will be more fully described, and particularly pointed out in the appended claims.

In the accompanying drawings,

Figure 1 is a side elevation of my improved tip showing one form of figured surface which is molded thereon by corresponding surfaces of the compressing or molding dies.

Figure 2 illustrates one method of heating the dies, also a method of applying a solvent material to the fabric before the tipping material is applied to the lacing.

Figure 3 is an end view showing my improved tip as applied to the compressed portion of a lacing.

Figure 4 is a perspective view of a short length of celluloid adapted to be applied to a lacing to form a tip thereon.

It is found in practice of great advantage in the construction of lacing tips to form the same of a readily moldable material such as celluloid, zylonite, bakelite and other similar moldable materials and to treat the tipping material either with a solvent or with heat or with both to soften the material sufficiently to enable it to be compressed and to cause its outer softened surface to be readily molded with the desired design, preferably formed in the dies, and to also cause the softened material to enter the interstices of the lacing fabric to positively prevent the tip from being withdrawn from the lacing after having been applied thereto; and the following is a detailed description of one method by which this tipping material is applied to the lacing.

With reference to the drawings, 10 designates a strip of celluloid or other similar suitable material which is cut to the desired length by means of dies 11 and 12 and by which dies this length of material is wound or coiled about that portion of the lacing 13 which is located between the dies and is applied by pressure to that portion of the lacing.

In order to cause this tipping material to firmly adhere to the lacing fabric, in some cases, I heat the dies, which may be done by any suitable means, that shown being by passing a current of electricity through the dies by means of wires 14 and 15, by which the dies are heated to the desired temperature, which heat acts upon the strip of celluloid to soften it sufficiently to enable it to be suitably molded into the desired shape and also to permit its inner surface to be compressed into the interstices of the tipping fabric and also enable its outer surface to readily take the shape or design formed in the lacing engaging surface of the dies. In some instances it is found of advantage to apply a solvent material to the lacing before applying the covering strip of celluloid thereto. This solvent which may be acetone, denatured alcohol or any other suitable material may be employed to act upon to soften the celluloid and is herein shown as being sprayed upon the fabric through a spray pipe 16 at a point the length of a lacing from the dies whereby the next forward feeding of the lacing brings this impregnated or treated portion of the lacing into the dies and around which treated portion is forced a strip of celluloid, the solvent acting upon the inner surface of this covering to soften it sufficiently so that it will readily enter the interstices of the fabric and be locked firmly thereto. In still other cases, I employ both the solvent and the heat when it is desired to further soften both the inner and outer surfaces of the tipping material.

By my improved method of applying the tip, I am enabled to chase, groove or otherwise prepare the tip-engaging portions of the die with a figured surface, which figures may include corrugations either circular or longitudinal or any other design which it is desired to imprint or impress into the surface of the tip to cause it to better grip the lacing fabric and to also render the tip more artistic and attractive in appearance, which designs are readily impressed into the surface of the tip especially when the same is in a softened condition.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the terms of the appended claims.

I claim:

1. A method of forming a lacing tip, which consists in applying a celluloid solvent to a portion of the lacing, advancing the treated portion to a set of dies, operating the dies to cut and wrap a length of sheet celluloid about the treated portion of the lacing and thus softening and forcing the celluloid into the interstices of the lacing fabric.

2. A method of forming a lacing tip, which consists in applying a celluloid solvent to a portion of the lacing, advancing the treated portion to a set of dies, feeding a strip of celluloid to the dies and operating the dies to cut and wrap the strip about the fabric by one continuous forward movement of the dies.

3. A method of forming a lacing tip, which consists in treating a portion of the lacing with a celluloid solvent, advancing the treated portion to a set of dies having a figured engaging surface, feeding a strip of celluloid to the dies and operating the dies to cut and wrap said strip about said treated portion of the lacing and simultaneously impressing upon the outer surface of the tip the figures or characters formed on the dies.

4. A method of forming a lacing tip of celluloid, which consists in applying a celluloid solvent to a portion of the lacing, wrapping a sheet of celluloid about said treated portion, applying pressure through dies to force the softened celluloid into the interstices of the lacing and simultaneously corrugating the wrapping material to form a figured inner and outer surface to assist in preventing the accidental removal of the tip.

In testimony whereof I affix my signature.

JOHN R. DENNIS.